US010802825B2

(12) United States Patent
Guan et al.

(10) Patent No.: US 10,802,825 B2
(45) Date of Patent: Oct. 13, 2020

(54) COGNITIVE SOFTWARE PORTING ASSISTANT SYSTEM

(71) Applicant: International Business Machines Corporation, Armonk, NY (US)

(72) Inventors: Xiao Feng Guan, Shanghai (CN); Ke Wen Lin, Shanghai (CN); Yuxuan Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 45 days.

(21) Appl. No.: 16/284,159

(22) Filed: Feb. 25, 2019

(65) Prior Publication Data

US 2020/0272458 A1 Aug. 27, 2020

(51) Int. Cl.
*G06F 9/44* (2018.01)
*G06F 8/76* (2018.01)
*G06F 8/41* (2018.01)
*G06F 8/71* (2018.01)

(52) U.S. Cl.
CPC ............... *G06F 8/76* (2013.01); *G06F 8/427* (2013.01); *G06F 8/71* (2013.01)

(58) Field of Classification Search
USPC .......................................................... 717/121
See application file for complete search history.

(56) References Cited

U.S. PATENT DOCUMENTS

| 7,334,223 | B2* | 2/2008 | Kumar | G06F 8/36 717/104 |
| 9,348,568 | B2* | 5/2016 | Zachariah | G06F 8/51 |
| 9,378,014 | B2* | 6/2016 | Wilson | G06F 8/30 |
| 9,535,664 | B1* | 1/2017 | Foster | G06F 8/48 |
| 9,576,240 | B2* | 2/2017 | Jeong | G06F 9/5066 |
| 2012/0254289 | A1* | 10/2012 | Sathish | G06Q 30/0631 709/203 |
| 2014/0282372 | A1* | 9/2014 | Araya | G06F 8/447 717/106 |
| 2015/0154011 | A1* | 6/2015 | Ceng | G06F 8/51 717/137 |
| 2018/0077143 | A1* | 3/2018 | Sridharan | H04L 63/0884 |
| 2018/0357145 | A1* | 12/2018 | Sarangapani | G06F 8/437 |

* cited by examiner

*Primary Examiner* — Anna C Deng
(74) *Attorney, Agent, or Firm* — Cantor Colburn LLP; Teddi Maranzano

(57) ABSTRACT

Embodiments include a method, a cognitive software porting assistant system, and a computer program product for operating a cognitive software porting assistant system. Embodiments include analyzing code to identify strings of the code, tokenizing the strings of the code into tokens, and identifying a first set of tokens and a second set of tokens from the tokens, wherein the first set of tokens corresponds to a first platform and the second set of tokens corresponds to the second platform. Embodiments also include generating a first syntax tree for the first set of tokens and a second syntax tree for the second set of tokens, and serializing the first syntax tree and the second syntax tree. Embodiments include comparing the first serialized syntax tree with the second serialized syntax tree, and saving a mapping of the first serialized syntax tree and second serialized syntax tree responsive to the comparison.

16 Claims, 6 Drawing Sheets

COGNITIVE SOFTWARE PORTING ASSISTANT SYSTEM

BACKGROUND

The present invention generally relates to porting and migrating software programs, and more specifically, to a cognitive software porting assistant system.

Instances may arise where software may need to be adapted to create an executable program for a computing environment that is different from the one for which it was originally designed. For example, the software may be adapted for a different language, different CPU, different operating system, different third-party library, etc. By porting from one platform to another, the need to completely generate new source code is avoided.

SUMMARY

Embodiments of the present invention are directed to a computer-implemented method for operating a cognitive software porting assistant system. A non-limiting example of the computer-implemented method includes analyzing code to identify strings of the code, tokenizing the strings of the code into tokens, and identifying a first set of tokens and a second set of tokens from the tokens, wherein the first set of tokens corresponds to a first platform and the second set of tokens corresponds to the second platform. The computer-implemented method includes generating a first syntax tree for the first set of tokens and a second syntax tree for the second set of tokens, serializing the first syntax tree and the second syntax tree, comparing the first serialized syntax tree with the second serialized syntax tree, and saving a mapping of the first serialized syntax tree and second serialized syntax tree responsive to the comparison.

Embodiments of the present invention are directed to a system for operating a cognitive software porting assistant system. A non-limiting example of the system includes a storage medium, the storage medium being coupled to a processor. The processor is configured to analyze code to identify strings of the code, tokenize the strings of the code into tokens, and identify a first set of tokens and a second set of tokens from the tokens, wherein the first set of tokens correspond to a first platform and the second set of tokens correspond to the second platform. The processor is also configured to generate a first syntax tree for the first set of tokens and a second syntax tree for the second set of tokens, serialize the first syntax tree and the second syntax tree, compare the first serialized syntax tree with the second serialized syntax tree, and save a mapping of the first serialized syntax tree and second serialized syntax tree responsive to the comparison.

Embodiments of the invention are directed to a computer program product for cognitive software porting, the computer program product comprising a computer-readable storage medium having program instructions embodied therewith. The program instructions are executable by a processor to cause the processor to perform a method. A non-limiting example of the method includes analyzing code to identify strings of the code, tokenizing the strings of the code into tokens, and identifying a first set of tokens and a second set of tokens from the tokens, wherein the first set of tokens corresponds to a first platform and the second set of tokens corresponds to the second platform. The method includes generating a first syntax tree for the first set of tokens and a second syntax tree for the second set of tokens, serializing the first syntax tree and the second syntax tree, comparing the first serialized syntax tree with the second serialized syntax tree, and saving a mapping of the first serialized syntax tree and second serialized syntax tree responsive to the comparison.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
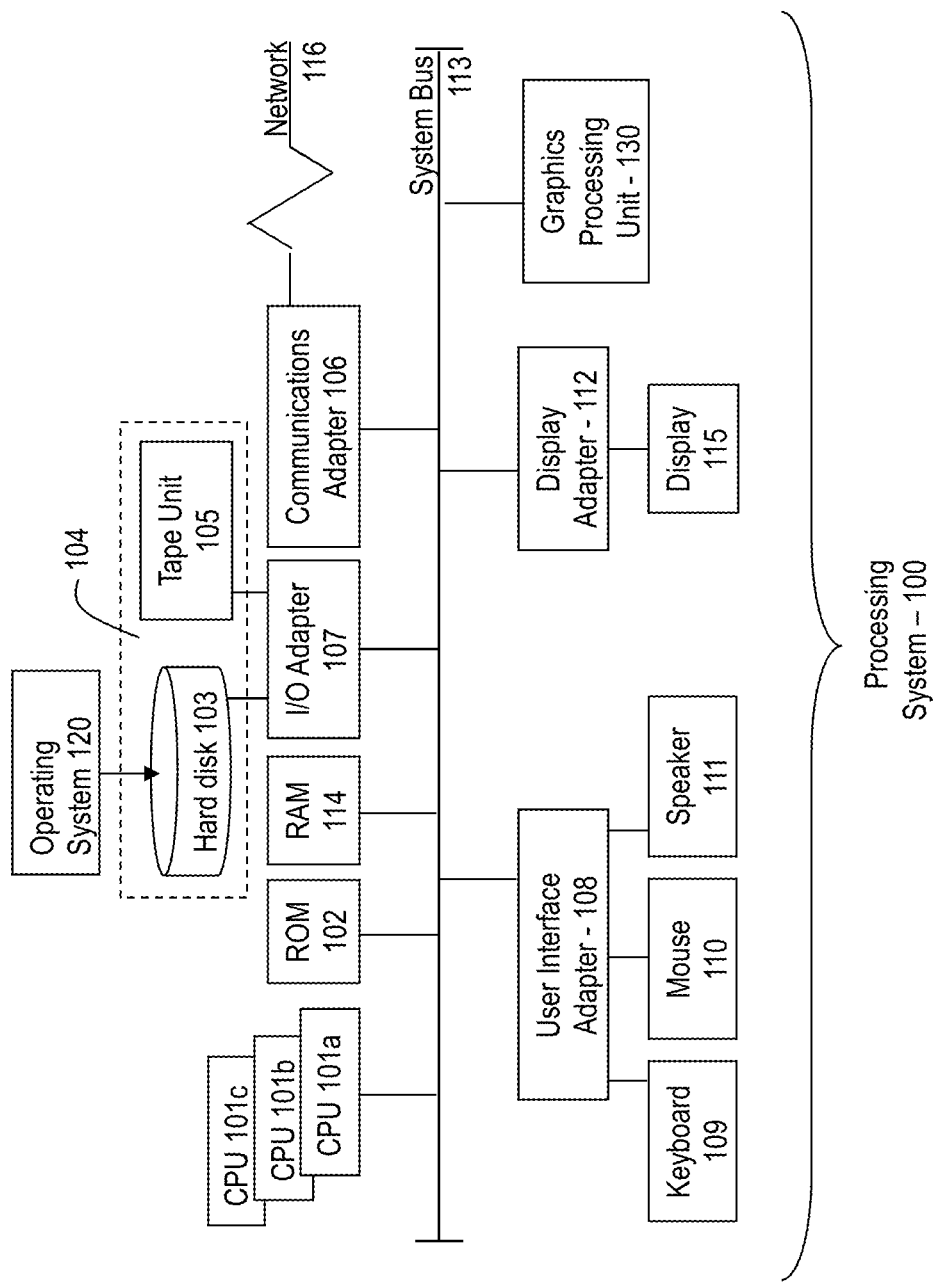
FIG. 1 depicts a block diagram illustrating one example of a processing system for practice of the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, porting is the process of adapting software so that an executable program can be created for a computing environment that is different from the one for which it was originally designed. Migration among different computing environments (CPUs, OSes, Runtimes).

Currently, porting from one hardware architecture to another hardware architecture, or from one compiler to another compiler, or both, is very complex. In some instances, porting requires expertise on either/both hardware architecture and/or compiler usage. In addition, hardware and compiler developers likely only focus on several specific platforms or compilers which can present further complexities.

Therefore, porting applications in an efficient manner can be very complex. Techniques are described herein which can provide assistance to developers during the porting process to alleviate some issues that may arise.

Turning now to an overview of the aspects of the invention, one or more embodiments of the invention address the above-described shortcomings of the prior art by providing a system and method for automatically porting a first project to a second project by analyzing and examining existing relationships between projects of different platforms. The analysis includes receiving the code of at least a first and second platform, determining relationships by tokenizing the code, forming abstract syntax trees and serializing the syntax trees, and comparing the serialized syntax trees to determine if a relationship exists. These relationships can be stored and used to assist future porting and migration requests. In addition, the analysis can include verifying the relationship by building the updated project and testing the validity of the porting and migration. Confidence scores can be associated with each relationship among the various platforms to provide information on the likelihood of a correct mapping between platforms.

The above-described aspects of the invention address the shortcomings of the prior art by providing techniques to automatically discover relationships among various platforms for porting and migrating software from one platform to another. The technical effects and benefits include alleviating the burden required of the developers to perform the porting or migration process. The technical effects and benefits also reduce the time needed to perform the porting and migration process.

Turning now to a more detailed description of aspects of the present invention, FIG. 1 depicts a processing system 100 for implementing the teachings herein according to embodiments of the invention. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
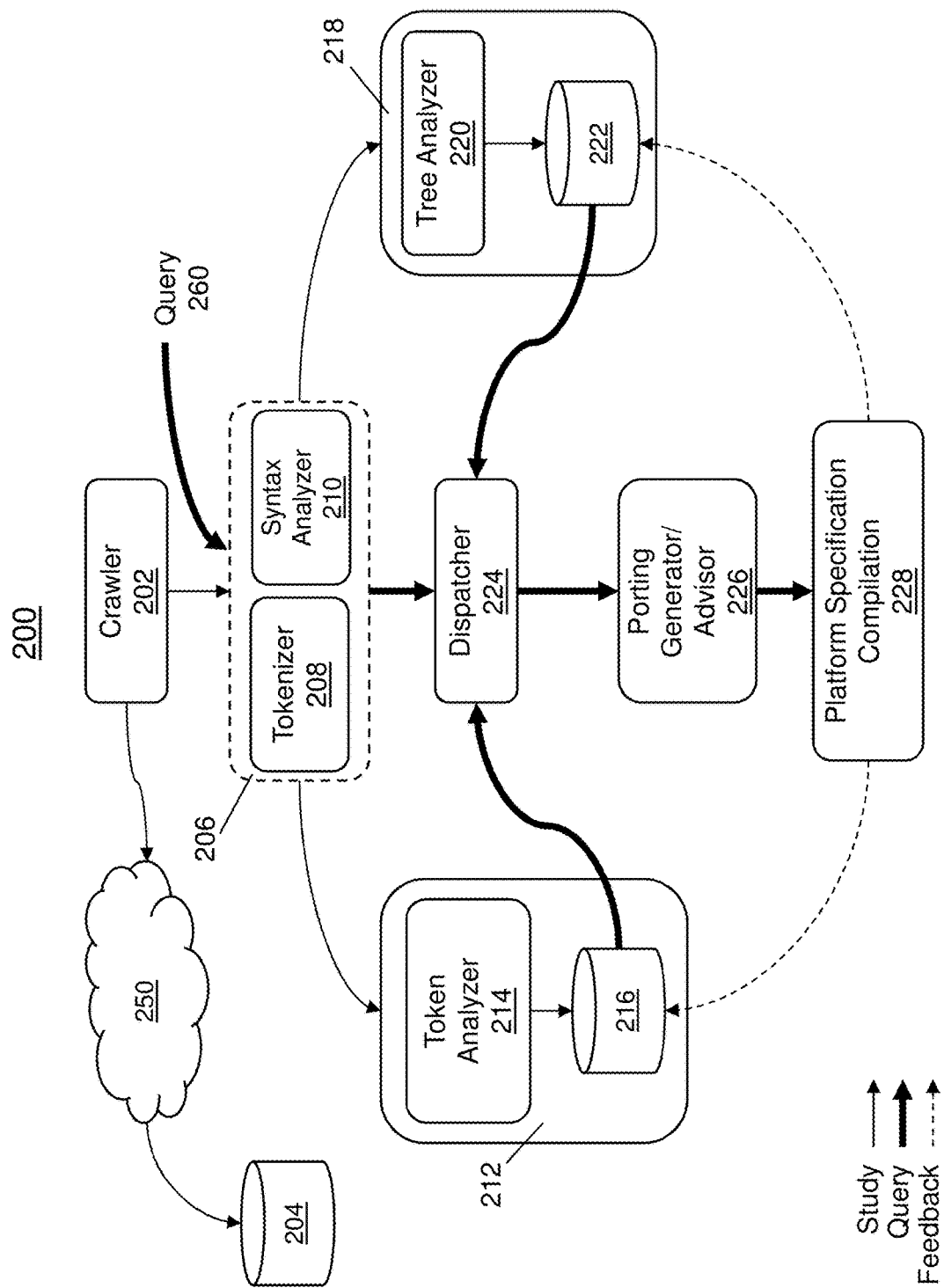
FIG. 2 depicts an example cognitive porting assistant system in accordance with one or more embodiments.

Now referring to FIG. 2, a system 200 for implementing porting assistance in accordance with one or more embodiments is shown. The system 200 includes a crawler 202 that is configured to extract information from code such as source code and identify the hardware/compiler specific options list and source code snippets as records based on some platform/compiler specific preprocessed macros. A study process (indicated by the solid line); a query process (indicated by the heavy weighted lines; and a feedback process (indicated by the dashed line) is shown. The study process gathers data from the code to form relationships and mappings between a source and target platform. The query process provides a flow to perform the porting or migration process. The feedback process is used to refine the mapping between the source and target platforms. Referring back to FIG. 2, the crawler 202 can obtain the source code from a database 204 over a network 250 or some other source of code that is accessible to the crawler 202. The crawler 202 can be configured to communicate with a processing module 206.

The processing module 206 includes a tokenizer 208 and a syntax analyzer 210. The processing module 206 is configured to receive and process data, such as source code, options list, pragma, inline assembly, built-in functions, etc., from the crawler 202. In addition, the processing module 206 is also configured to receive a query from the user to request a porting/migration request from a first platform to a second platform.

The tokenizer 208 is configured to divide the sequence of strings received from the crawler 202 into segments where the division can provide words, keywords, phrases, symbols or other elements called tokens. These tokens can be identified by the tokenizer 208 by white space, punctuation marks, or some other configurable character(s) or number(s) or symbol(s).

The tokenizer 208 tokenizes the strings extracted from the source code and is configured to identify portions of code and associates each portion with tokens. For example, the tokenizer can identify option/directive/pragma strings and tokenizes them. The tokens become the input for the processing by the syntax analyzer 210 and dispatcher 224.

Token analyzer 214 receives data from the tokenizer 208 and establishes a dictionary, training from occurrence rates of tokens with statistical methods to determine identical pairs in separate sets. The results of the token analyzer 214 can be stored in a database 216 and used in subsequent processing by providing the data to a dispatcher 224. A first set of tokens of a first platform and a second set of tokens of a second platform can be obtained from the tokenizer analyzer 214. Platforms can include but are not limited to the x86 platform and the POWER platform. Subsequently, the token analyzer 214 maintains and updates a count of occurrence of each identified token. Identifying the token occurrence rates allow, the token analyzer to determine whether a source option always comes along with a target option based on the occurrence rates being identical.

In another embodiment of the invention, a name verification module can be used to identify similar tokens. The name verification module can leverage natural language processing of online documents to obtain the name of compiler options/pragmas that are used in name comparison.

Responsive to identifying a corresponding relationship, based on similar occurrence rates among tokens and/or name matching among tokens, a mapping can be generated and stored. It should be understood that other techniques can be used to identify the mappings between tokens and is not limited by the examples provided above.

The syntax analyzer 210 is configured to process structured input strings to generate a syntax tree. The syntax tree is an abstract representation of the code statements/expressions. Building the syntax tree can be performed in front-end technology. The syntax tree can be generated using techniques available in the art. The syntax analyzer 210 first analyzes the code to identify the similarity between the input and the output. Responsive to generating the syntax tree the tree is serialized into a sequence of numbers to perform a comparison of the trees.

Figure 3:
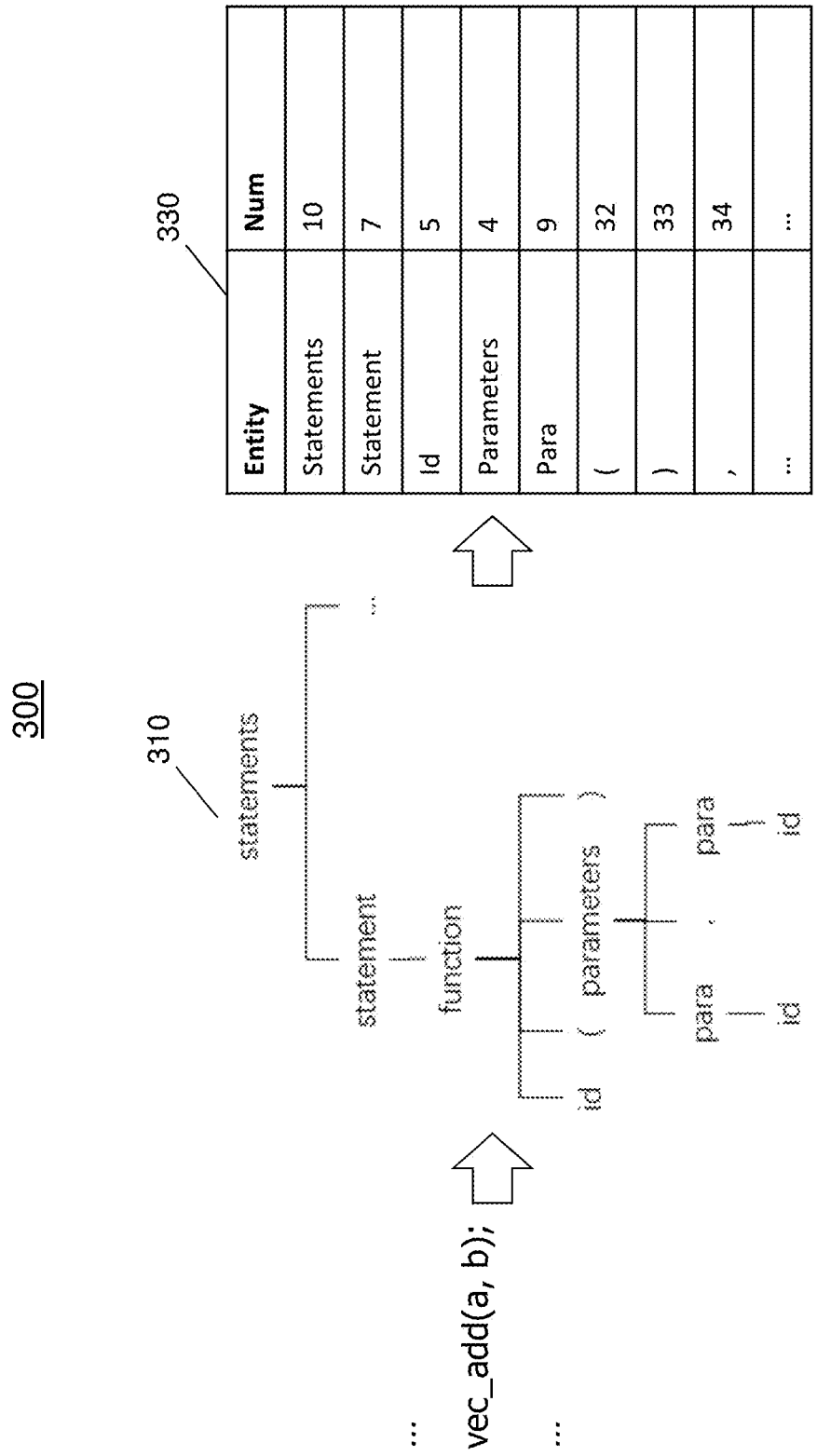
FIG. 3 depicts a syntax tree structure used in the cognitive porting assistant system in accordance with one or more embodiments.

A syntax tree 310 can be formed for portions of the code such as the inline assembly function and built-in functions. In one example, FIG. 3 provides a syntax tree 310 that is formed for vec_add(a, b) by the syntax analyzer 210. The first level of the syntax tree 310 is a root level which identifies statements of one or more portions of code. The next level of the syntax tree 310 identifies a particular statement of a plurality of statements, where the statement corresponds to a particular function, for example, vec_add is identified. In the next level, the function ID, open parenthesis, parameters, and closed parenthesis is provided. The next level of the syntax tree 310, identifies the specific parameters and parameter ID for the two parameters of the function.

After forming the tree, each of the entities is assigned a specific number. The table 330 identifies various "Entity" and "Number" values that are assigned to each element. In a non-limiting example, the numbers can be assigned as shown in table 330 of FIG. 3.

The syntax tree 310 and the table 320 are used to form the serialized syntax tree sequence. The serialized syntax tree for the statement in this example provides 10 7 32 5 4 5 34 5 33|3. The process is repeated for each other statement.

In one or more embodiments of the invention, the tree analyzer 220 compares and maps the serialized trees which are further discussed below with reference to FIG. 4.

Finally, the processing module 206 is configured to receive a query 260 to for porting and coupled to a query dispatcher 224 which is configured to communicating with a porting generator/advisor 226. The porting generator/advisory 226 is configured to provide the suggested mapping information from the processing module 206 and dispatcher 224 responsive to the comparison. The platform specification compilation module 228 compiles the software to perform the porting of the software code from the first platform to the second platform. This process determines whether the mapping is successful and provides feedback (as indicated by the dashed line) to the database 216 for mapping the options/directives/pragmas and the database 222 for mapping the built-in, inline assembly functions.

Figure 4:
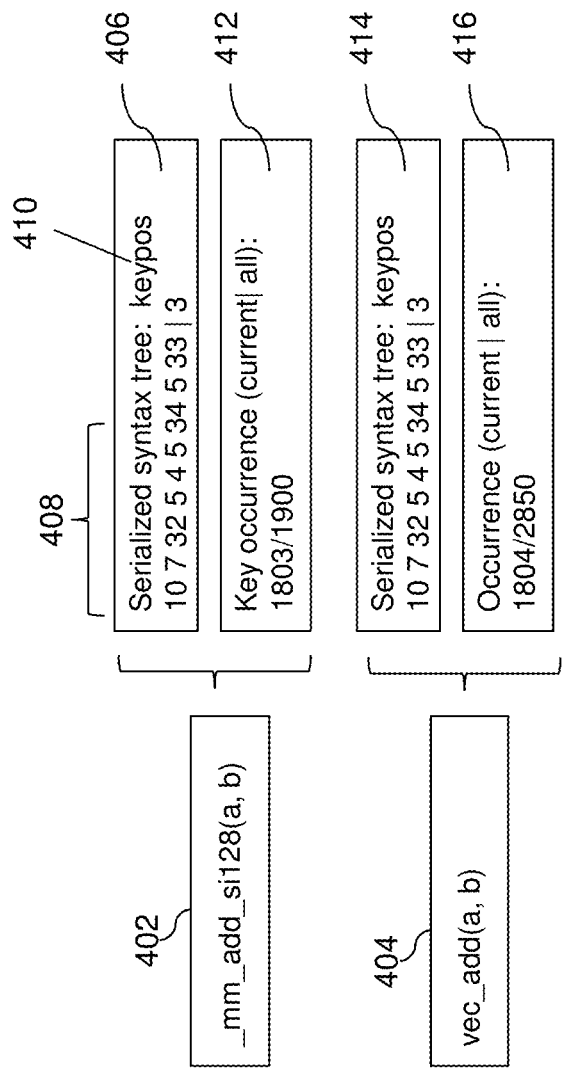
FIG. 4 depicts an example of the cognitive porting assistant system in accordance with one or more embodiments.

Now referring to FIG. 4 an example comparing the serialized syntax tree sequences for a first function in a first platform and a second platform is shown. A first function 402 for "add" of a first platform is provided. An entry 406 includes a serialized syntax tree 408 with a key position 410 is shown. A corresponding entry 412 provides the key occurrence for the function is 1803 out of 1900 is shown.

A second function 404 for "add" of a second platform is shown including an entry 414 and 416. Another processing module 218 receives data from the syntax analyzer 210 to analyze the serialized syntax trees. During the analysis, a first tree is compared to a second tree. In addition, built-in, inline assembly mapping is performed and the results are communicated to the query dispatcher. In this example, the syntax trees for the first function 402 and the second function 404 match. In addition, the key occurrence is very similar. The similarity can be determined based on a configurable threshold.

Reference numeral 410 provides a "Key Position" value (keypos) whose value indicates the position of the name for a built-in function. In one or more embodiments of the invention, the value can be compared between the serialized syntax trees to provide an indication of an appropriate porting.

In some embodiments of the invention, the noise between a first function and a second function can be filtered by identifying code that has the same syntax tree structure and further comparing the occurrence. As shown in this non-limiting example, the two occurrences are not similar therefore the two portions of code should not be mapped to one another for porting. The first statement includes a key occurrence of "183" and the second statement includes a key occurrence of "36." A threshold occurrence can be used to determine whether the key occurrences being compared are within range to be mapped together. The key occurrence threshold can be a pre-defined value or a configurable value.

When the code is finally compiled and accepted during the compilation, the ported software is considered successful and provides positive feedback. The feedback can be used to increase a confidence score for porting the software of the mapping stored in the database 216 and 222. In the event the code is unable to be compiled, negative feedback can be recorded. In addition, the mapping in the dictionary may be deleted. Responsive to the similarity among the serialized syntax trees and the occurrence rate of the tokens in each set a confidence score can be generated.

During a query process (indicated by the heavy weighted lines), when a user queries the porting assistant system, the query 260 can be parsed by an inquiry module. In one or more embodiments of the invention, the inquiry module can be implemented in a processor. The inquiry module can be configured to identify a porting source/target platform and source/target compiler from the received query. The query dispatcher 224 is configured to translate the options list, pragmas, and code snippets to the related form on the target platform based on the scalar dictionary and machine learning module, a file such as a patch file can be generated for efficient review.

The query dispatcher 224 communicates with the patch generator/porting advisor 226. The patch generator/porting advisor communicates with the platform-specific compilation module 228 which is configured to provide feedback to processing module 218 and 212 to optimize the mapping.

Figure 5:
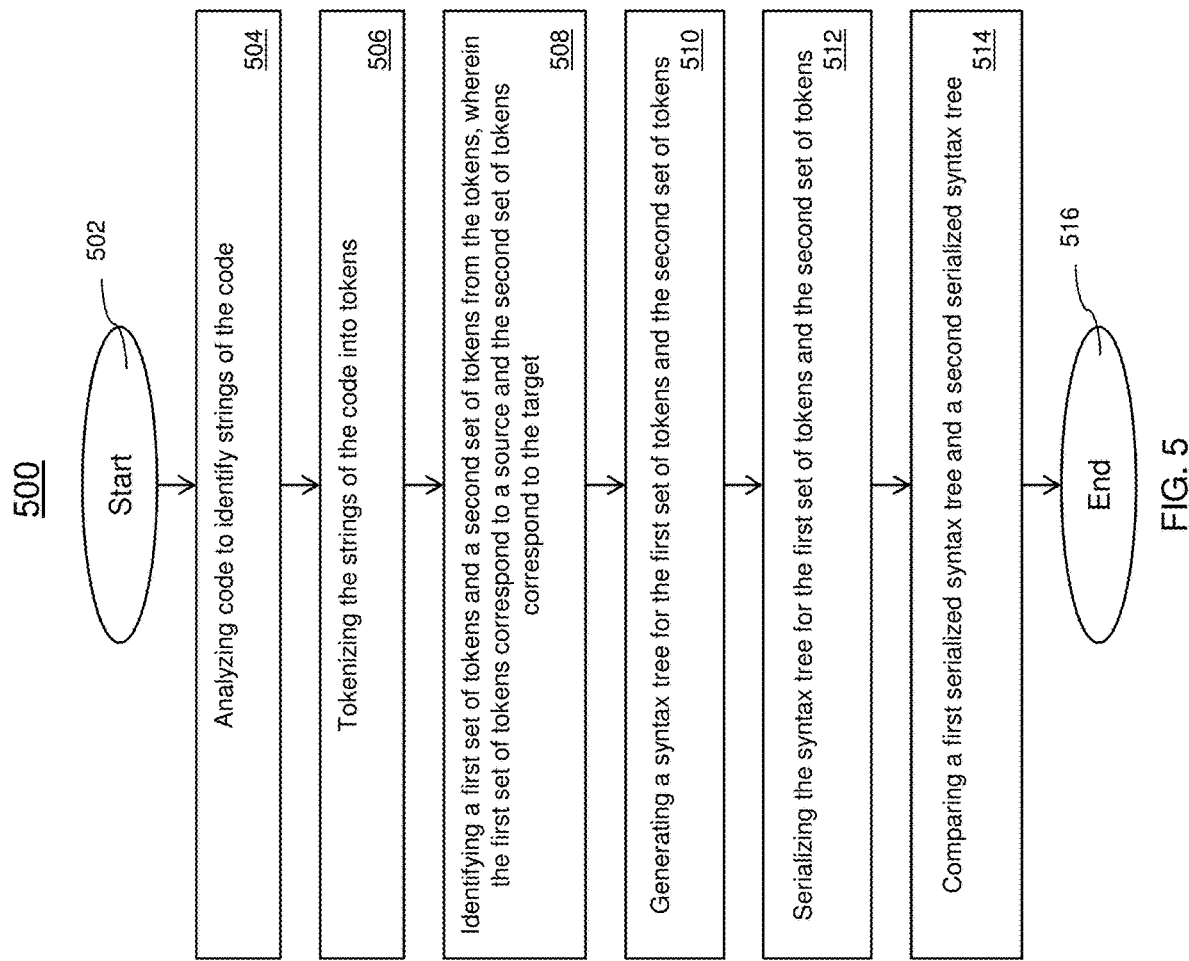
FIG. 5 depicts a flowchart of a method for operating the cognitive porting assistant system in accordance with one or more embodiments.

Now referring to FIG. 5, a flowchart of a method 500 for operating a cognitive software porting assistance system in accordance with one or more embodiments is shown. The method can be implemented in any system such as that shown in FIGS. 1 and 2. The method 500 begins at block 502 and proceeds to block 504 which provides for analyzing, by a processor, code to identify strings of the code. A processor can receive source code to extract strings of code. Block 506 provides tokenizing the strings of the code into tokens. The tokenizer 208 divides the code of a plurality of platforms for further processing.

Block 508 provides for identifying a first set of tokens and a second set of tokens from the tokens, wherein the first set of tokens corresponds to a source platform and the second set of tokens corresponds to the target platform. A set of tokens can be determined by a function or set of functions of the code, where a first set of tokens corresponds to a function of code in a first platform and the second set of tokens corresponds to a function of a code in a second platform to be ported or migrated to. The tokenizer analyzer 214 can be configured to identify each token and track the occurrence of each token in the code. The count of occurrence of each token can provide an indication if the first platform code is similar to the second platform code.

Block 510 provides for generating a syntax tree for the first set of tokens and the second set of tokens. The method 500 at block 512 provides for serializing the syntax tree for the first set of tokens and the second set of tokens. Each entity of the syntax tree is assigned a number and arranged in a serialized manner to compare to other serialized tokens. At block 514, the method 500 provides for comparing a first serialized syntax tree and a second serialized syntax tree. Responsive to the comparison, feedback can be provided to increase a confidence score that relates the first serialized syntax tree and a second serialized syntax tree to indicate porting the first platform to a second platform. Based on the comparison, the porting can be built and tested. The results of the method 500 can be used to efficiently perform the porting or migration of software from a first platform to another platform in an automated fashion. The method 500 ends at block 516. It should be understood that one or more steps of the method 500 can be repeated to further optimize the determined relationships between platforms. Over time, the confidence of mapping from a platform to another will be used with high confidence the correct mapping is used.

Figure 6:
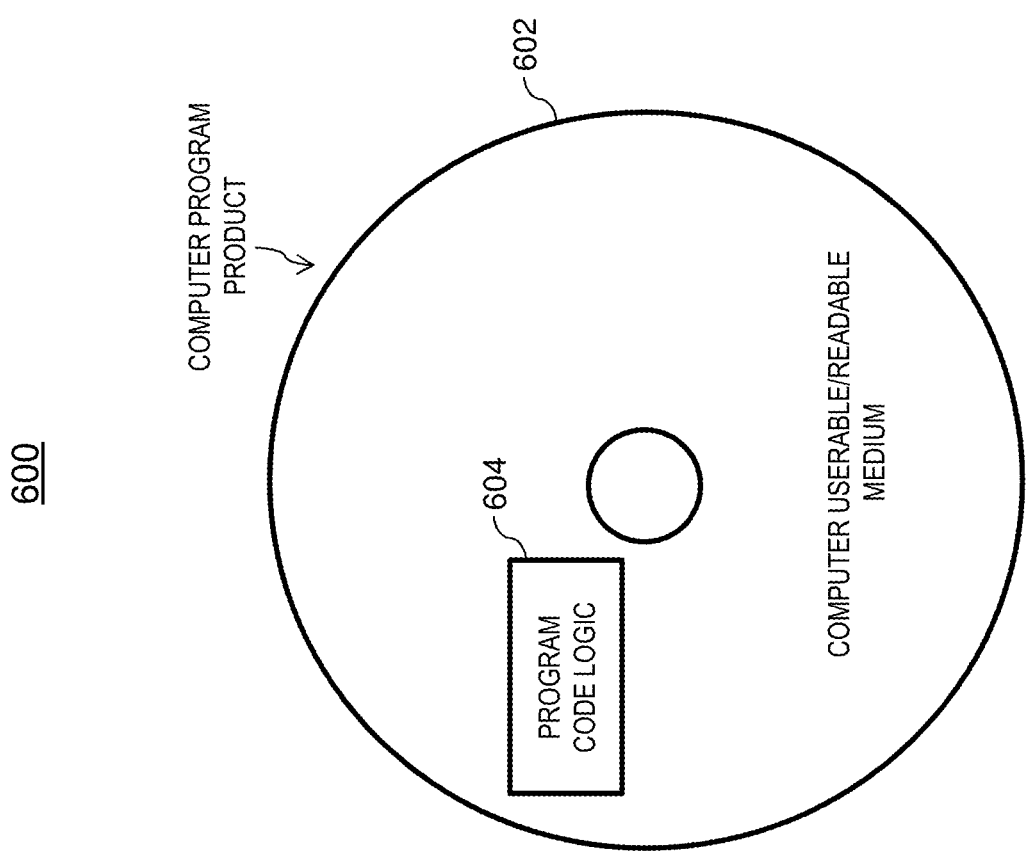
FIG. 6 depicts a computer program product in accordance with one or more embodiments.

Referring now to FIG. 6, a computer program product 600 in accordance with an embodiment that includes a computer-readable storage medium 602 and program instructions 604 is generally shown.

The techniques described herein improve over the prior art by automatically porting projects from one platform to another platform by learning existing porting rules and patterns from multiple sources. This allows for incrementally learning from real-world open source projects and independent software vendors. The technical effects and benefits provide a system which can help users port projects from one platform to another platform automatically.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for operating a cognitive software porting assistant system, the computer-implemented method comprising:
    analyzing code to identify strings of the code;
    tokenizing the strings of the code into tokens;
    identifying a first set of tokens and a second set of tokens from the tokens, wherein the first set of tokens corresponds to a first platform and the second set of tokens corresponds to the second platform;

generating a first syntax tree for the first set of tokens and a second syntax tree for the second set of tokens;
serializing the first syntax tree and the second syntax tree;
comparing the first serialized syntax tree with the second serialized syntax tree, wherein comparing comprises comparing names between tokens of the first platform and the second platform to determine a mapping of the first serialized syntax tree and the second serialized syntax tree;
saving the mapping of the first serialized syntax tree and the second serialized syntax tree responsive to the comparison, wherein the mapping comprises mapping tokens from the first platform to the second platform based at least in part on a count of counting an occurrence of each token in the first set of tokens and an occurrence of each token in the second set of tokens; and
performing porting from the first platform to the second platform based at least in part on the saved mapping of the first serialized syntax tree and the second serialized syntax tree.

2. The computer-implemented method of claim 1, wherein the mapping further comprises adding the mapping into a database responsive to exceeding an occurrence threshold value for each token in the first set of tokens and the second set of tokens.

3. The computer-implemented method of claim 2, further comprising receiving a request to perform porting from the first platform to the second platform;
retrieving mapping information from the database based on the request; and
performing porting from the first platform to the second platform based to least in part on the retrieved mapping information.

4. The computer-implemented method of claim 1, wherein generating the first and second syntax trees are based at least in part on at least one of an inline assembly function or a built-in function for the code.

5. The computer-implemented method of claim 2, further comprising obtaining feedback to update mapping information in the database.

6. The computer-implemented method of claim 1, wherein comparing the names between tokens of the first platform and the second platform to determine a mapping of the first serialized syntax tree and second serialized syntax tree is based on performing natural language processing to parse online documents of compiler options or pragmas for tokens.

7. A cognitive software porting assistant system, the system comprising:
a processor;
a storage medium, the storage medium being coupled to the processor;
the processor configured to:
analyze code to identify strings of the code;
tokenize the strings of the code into tokens;
identify a first set of tokens and a second set of tokens from the tokens, wherein the first set of tokens correspond to a first platform and the second set of tokens correspond to a second platform;
generate a first syntax tree for the first set of tokens and a second syntax tree for the second set of tokens;
serialize the first syntax tree and the second syntax tree;
compare the first serialized syntax tree with the second serialized syntax tree, wherein the comparing comprise comparing names between tokens of the first platform and the second platform to determine a mapping of the first serialized syntax tree and the second serialized syntax tree;
save the mapping of the first serialized syntax tree and the second serialized syntax tree responsive to the comparison, wherein the mapping comprises mapping tokens from the first platform to the second platform based at least in part on a count of counting an occurrence of each token in the first set of tokens and an occurrence of each token in the second set of tokens; and
perform porting from the first platform to the second platform based at least in part on the saved mapping of the first serialized syntax tree and the second serialized syntax tree.

8. The system of claim 7, wherein the mapping further comprises the processor being configured to add the mapping into a database responsive to exceeding an occurrence threshold value for each token in the first set of tokens and the second set of tokens.

9. The system of claim 8, further comprising the processor being configured to receive a request to perform porting from the first platform to the second platform;
retrieve a mapping information from the database based on the request; and
perform porting from the first platform to the second platform based to least in part on the retrieved mapping information.

10. The system of claim 7, wherein generating the first and second syntax trees are based at least in part on at least one of an inline assembly function or a built-in function for the code.

11. The system of claim 7, wherein comparing the names between tokens of the first platform and the second platform to determine the mapping of the first serialized syntax tree and second serialized syntax tree is based on performing natural language processing to parse online documents of compiler options or pragmas for tokens.

12. A computer program product for operating a cognitive software porting assistant system, the computer program product comprising:
a processor;
a computer-readable storage medium having stored thereon program instructions executable by the processor to cause the processor to:
analyze code to identify strings of the code;
tokenize the strings of the code into tokens;
identify a first set of tokens and a second set of tokens from the tokens, wherein the first set of tokens correspond to a first platform and the second set of tokens correspond to a second platform;
generate a first syntax tree for the first set of tokens and a second syntax tree for the second set of tokens;
serialize the first syntax tree and the second syntax tree;
compare the first serialized syntax tree with the second serialized syntax tree, wherein the comparing comprise comparing names between tokens of the first platform and the second platform to determine a mapping of the first serialized syntax tree and second serialized syntax tree;
save the mapping of the first serialized syntax tree and second serialized syntax tree responsive to the comparison, wherein the mapping comprises mapping tokens from the first platform to the second platform based at least in part on a count of counting an occurrence of each token in the first set of tokens and an occurrence of each token in the second set of tokens; and perform porting from the first platform to the second platform based at least in part on the saved mapping of the first serialized syntax tree and the second serialized syntax tree.

13. The computer program product of claim 12, wherein the mapping further comprises adding the mapping into a database responsive to exceeding an occurrence threshold value for each token in the first set of tokens and the second set of tokens.

14. The computer program product of claim 13, wherein the instructions are further executable by the processor to cause the processor to receive a request to perform porting from the first platform to the second platform;

retrieve a mapping information from the database based on the request; and perform porting from the first platform to the second platform based to least in part on the retrieved mapping information.

15. The computer program product of claim 12, wherein generating the first and second syntax trees are based at least in part on at least one of an inline assembly function or a built-in function for the code.

16. The computer program product of claim 12, wherein comparing the names between tokens of the first platform and the second platform to determine the mapping of the first serialized syntax tree and second serialized syntax tree is based on performing natural language processing to parse online documents of compiler options or pragmas for name comparisons for the tokens.

* * * * *